May 19, 1970 L. A. ATTERMEYER 3,512,817
CONNECTOR
Filed Dec. 15, 1967 2 Sheets-Sheet 1
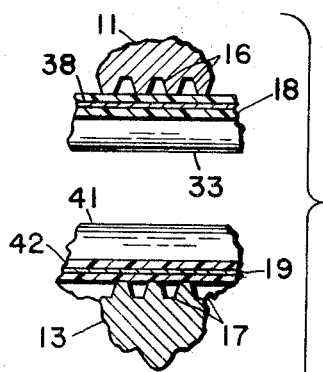
FIG. 3
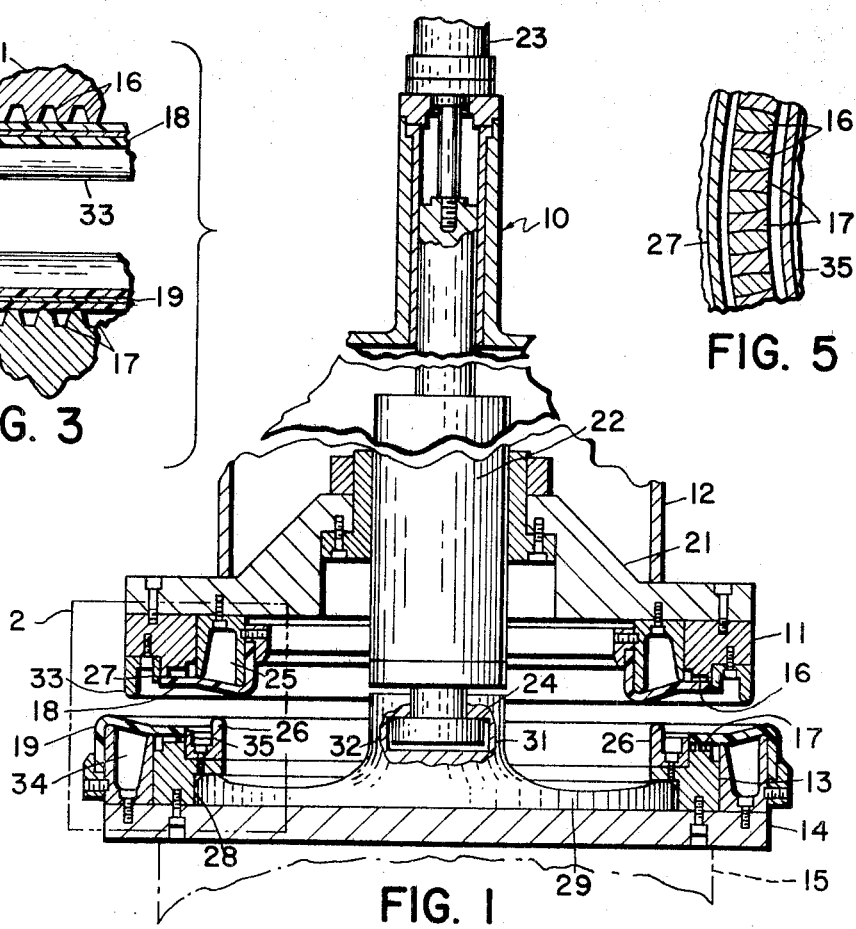
FIG. 1
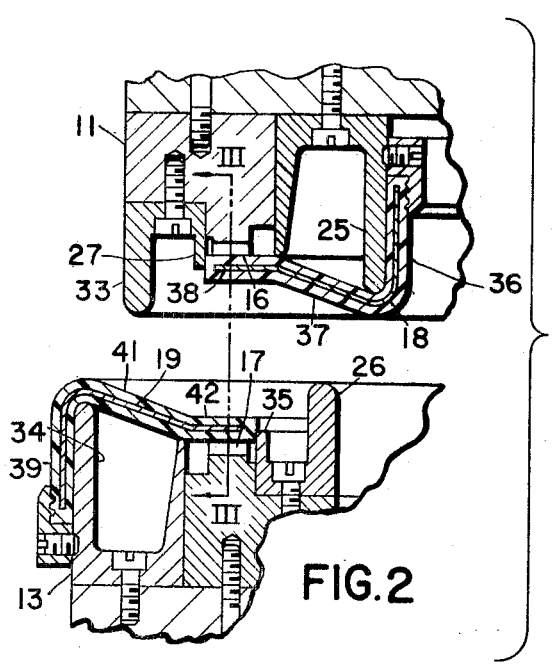
FIG. 2
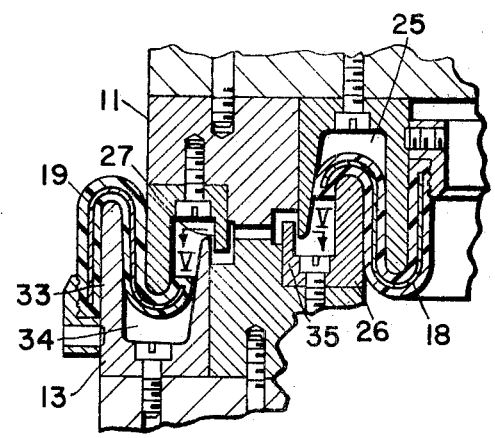
FIG. 4
FIG. 5
INVENTOR.
LAWRENCE A. ATTERMEYER
BY
ATTORNEY

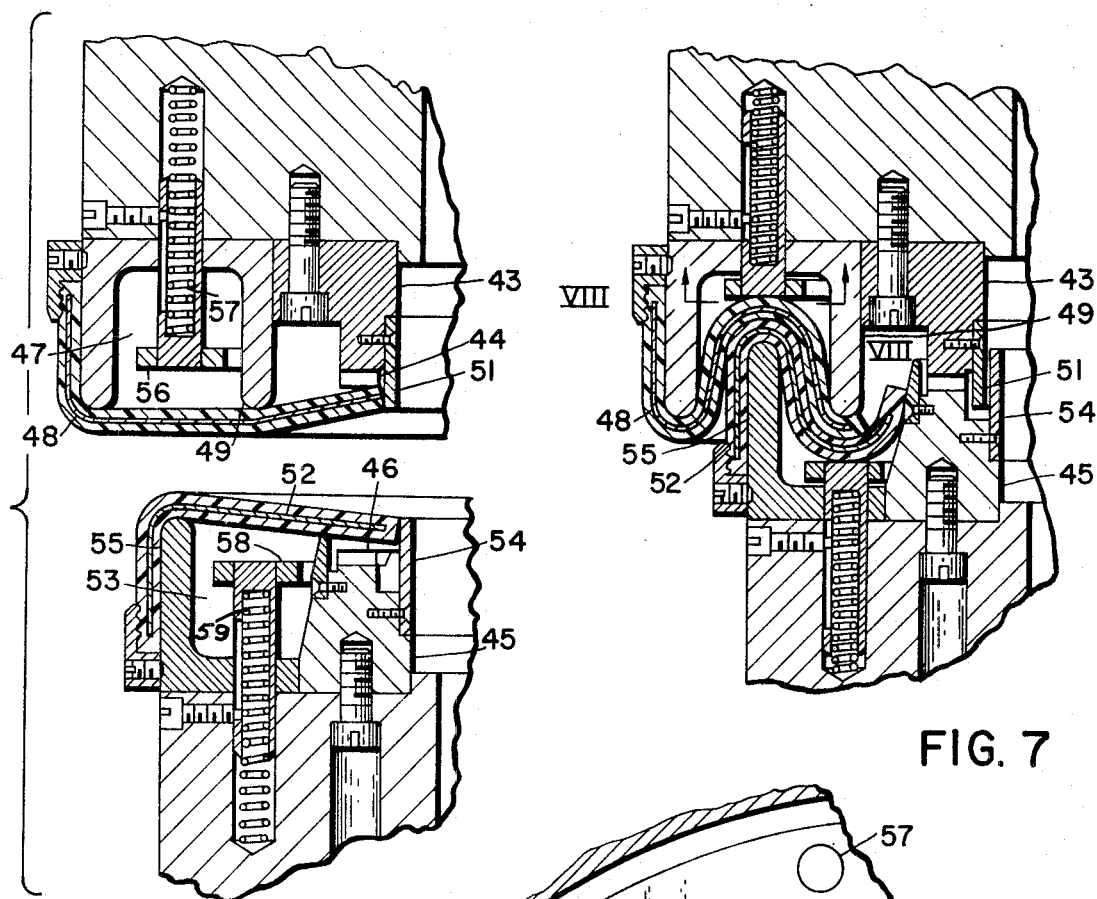
FIG. 6
FIG. 7
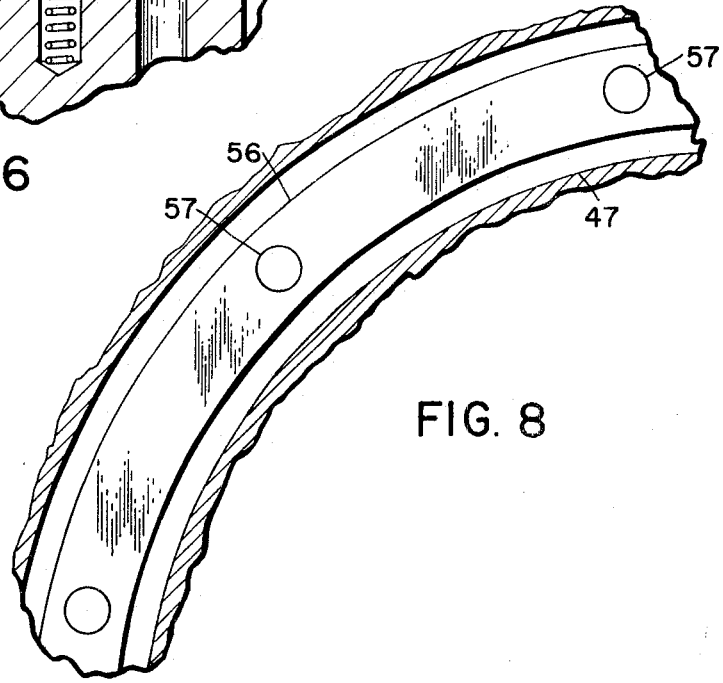
FIG. 8

United States Patent Office 3,512,817
Patented May 19, 1970

3,512,817
CONNECTOR
Lawrence A. Attermeyer, Cincinnati, Ohio, assignor to
The Cincinnati Milling Machine Company, Cincinnati,
Ohio, a corporation of Ohio
Filed Dec. 15, 1967, Ser. No. 690,926
Int. Cl. B25g 3/36
U.S. Cl. 287—103                                    9 Claims

ABSTRACT OF THE DISCLOSURE

This invention relates to a connector and, more particularly, to apparatus for connecting machine elements together for accurate location relative to one another and including a seal means for excluding foreign matter from the operative parts.

Background of the invention

It has been suggested that a manufacturing system could be operated automatically if it were possible to connect successive workpieces very accurately to any one of a number of work stations. Additional effectiveness in such a system, if selected tools, machine attachments or accessories could be attached to the spindles of certain work stations in the form of machine tools. A connector that will accomplish such a function is shown in the patent application of Perry and Bomkamp, Ser. No. 690,941, filed Dec. 15, 1967. However, the proper operation of such a connector is related to accurately-formed complementary projections, such as radial gear teeth. When the surfaces of the teeth are exposed to the conditions in a machining system, they are likely to receive deposits of foreign matter, such as dirt and metal chips. These deposits prevent absolute engagement of the operative surfaces and, therefore, inhibit the accurate location of workpieces and tools relative to the machine tools. Apparatus is available that could be used to prevent foreign matter from gaining access to the teeth, but for the most part they are expensive and, because of their complexity, are easily rendered inoperative by the same foreign matter that they were designed to combat. These and other difficulties experienced with the prior art devices have been obviated in a novel manner by the present invention.

It is, therefore, an outstanding object of the invention to provide a connector having a seal means for effectively excluding foreign matter from the operative surfaces.

Another object of this invention is the provision of a connector having a sealing apparatus that is operative both when the parts are connected and when they are separated.

A further object of the present invention is the provision of a connector having two bodies with interengaging complementary projections and having seal means associated with each body such that the seal means of any body will operate when that body is used to form a connection with any other body.

It is another object of the instant invention to provide a seal means for a connector which is inexpensive to manufacture and which is capable of a long life of useful service with a minimum of maintenance.

A still further object of the invention is the provision of a connector having a primary and a secondary body for use in a manufacturing system, wherein any one of a plurality of primary bodies may be called upon to engage with any one of a plurality of secondary bodies and wherein seal means is provided for each body to cover its operative elements when it is not joined to another body and to cooperate with the seal means of another body to exclude foreign matter when it is called upon to join with such another body.

With these and other objects in view, as will be apparent to those skilled in the art, the invention resides in the combination of parts set forth in the specification and covered by the claims appended hereto.

Summary of the invention

In general, this invention consists of a connector comprising a first body, a second body, a predetermined array of projections mounted on each body and extending toward the other body, the two arrays of projections being of complementary form to permit an accurate location of the first body relative to the second body, and seal means to protect the said projections from foreign matter both when the projections are in and out of engagement.

Brief description of the drawings

The character of the invention, however, may be best understood by reference to one of its structural forms, as illustrated by the accompanying drawings, in which:

FIG. 1 is a vertical sectional view of a connector embodying the principles of the present invention, FIG. 2 is an enlarged view of a portion of the connector when the operative elements are out of engagement, FIG. 3 is a vertical sectional view taken on the line III—III of FIG. 2, FIG. 4 is an enlarged view of a portion of the connector when the operative elements are in engagement, FIG. 5 is a horizontal sectional view taken on the line V—V of FIG. 4, FIG. 6 is a vertical sectional view of a modification of the connector with the operative elements out of engagement, FIG. 7 is a vertical sectional view of the modification with the operative elements in engagement, and FIG. 8 is a horizontal sectional view taken on the line VIII—VIII of FIG. 7.

Description of an embodiment of the present invention

Referring first to FIG. 1, wherein are best shown the general features of the invention, the connector, indicated generally by the reference numeral 10, is shown as having a first body 11 which is adapted to be attached to a portion 12 of a machine tool or the like and a second body 13 which is adapted to be connected, for example, to a fixture or pallet 14 to which a workpiece 15 is attached. The first body 11 is provided with a circular array of projections, such as radial gear teeth 16, while the second body 13 is provided with a circular array of radial gear teeth 17. The two arrays of teeth are complementary to permit an accurate location of the second body relative to the first body. A seal means in the form of a flexible element 18 is mounted on the first body and a similar flexible element 19 is mounted on the second body.

The first body 11 is of general annular form and is mounted on a heavy hub 21 in which is mounted a bar 22. The bar is capable of sliding motion along the major axis of the first body under the control of a linear actuator 23. At its lower end, it is provided with a T-head 24. Adjacent the inner periphery of the first body it is formed with a deep groove 25. Adjacent the outer periphery it is provided with an axially-extending ridge 33. The flexible element 18 is in the general form of a circular strip and has its inner periphery fastened to the inner periphery of the body on the side of the groove 25 away from the teeth 16. The inner periphery of the flexible element is pressed resiliently against the teeth with its edge pressing against a wall 27.

The second body 13 is also annular and of somewhat the same size as the body 11. It is formed with a rabbet 28 in which resides the outer periphery of a disk 29 having a central boss 31 formed with a T-slot 32. Adjacent its inner periphery the second body 13 is formed with an axially-extending ridge 26 which lies in opposition to the groove 25 formed in the first body 11. Adjacent its outer periphery the body 13 is provided with a groove 34 which lies in opposition to the ridge 33 formed on the first body 11. The flexible element 19 is in the general form of a circular strip and has its outer periphery fastened to the outer periphery of the body. Its inner peripheral surface presses resiliently against the teeth 17 and the edge presses against a wall 35.

FIG. 2 shows very clearly the condition of the parts of the connector when the teeth are out of engagement. As is evident in this view, the seal 18 is formed from a core of sheet metal to which has been applied a thick coat of a plastisol, such as tetrafluorethylene. It consists of a radial flange 36 by which it is fastened to the body, an inclined intermediate portion 37, and a flat outer portion 38 whose upper flat surface lies against the ends of the teeth 16 and whose edge fits tightly against the cylindrical surface of the wall 27. Similarly, the seal 19 associated with the second body 13 consists of an axially-extending flange 39 which is fastened to the outer periphery of the body, an intermediate portion 41 which lies over the groove 34, and a flat inner portion 42 whose flat lower surface lies against the teeth 17 and whose inner edge presses tightly against the wall 35.

FIG. 3 shows more clearly the manner in which the flat surfaces of the seals 18 and 19 lie against the flat ends of the teeth. Each of the arrays of teeth is completely enclosed and foreign matter excluded.

The operation of the invention is best understood from an examination of FIG. 4. When the actuator 23 is energized and the bar 22 is drawn upwardly, the T-head 24 operates with the T-slot 32 to pull the disk 29 upwardly and the second body 13 with it. Any desired rotation between the bodies takes place at this time before the teeth are engaged. As the second body approaches the first body, the ridge 26 engages the intermediate portion 37 of the seal 18 and presses it toward the groove 25. At the same time, the ridge 33 engages the intermediate portion 41 of the seal 19 and presses it toward the groove 34. As the two bodies draw closer together, the movement of the intermediate portions of the seals into the grooves causes the ends of the seals 18 and 19 to move away from the walls 27 and 35, respectively. Further movement of the bodies toward one another pulls the edges of the seals entirely away from the teeth and into the grooves. This leaves the teeth entirely free to engage one another and to locate the two bodies very accurately relative to each other. With the teeth engaged, the seal 19 prevents the introduction of foreign matter from the outer peripheries of the bodies and the seal 18 closes the inner peripheries. Furthermore, the integrity of the seals is maintained at intermediate points between "open" and "closed" conditions. This is because the seal does not begin to leave its wall 27 or 35 until the ridge has made pressure-tight engagement with the intermediate portion of the seal. The resilient character of the seal that makes it return to the condition shown in FIG. 2 when the ridge pressure is removed on re-opening also keeps the seal pressed against the ridge at all intermediate points.

FIG. 5 shows how the teeth 16 and 17 are engaged when the bodies are in "closed" condition. The walls 27 and 35 lie on either side of the meshed arrays.

A modified form of the invention is shown in FIGS. 6, 7, and 8, FIG. 6 showing the "open" condition and FIG. 7 showing the "closed" condition. A first body 43 is provided with a circular array of teeth 44 and a second body 45 is provided with meshing teeth 46. The body 43 is provided with a groove 47 located outwardly of the array of teeth and a seal 48 fastened to the body exteriorly of the groove. The seal 48 extends radially inwardly and covers the groove 47. It rests against an axially-extending ridge 49 and its inner edge lies against the ends of the teeth 44 and presses against a wall 51. Now, the second body 45 also is provided with a seal 52 which is fastened to the outer periphery of the body and extends radially inward to lie over a ridge 55, to bridge a groove 53 to extend over the teeth 46, and to press tightly against a wall 54. Of particular interest is the fact that the diameter of the outer periphery of the first body 43 is considerably larger than the diameter of the outer periphery of the second body 45. Furthermore, it is to be noted that both seals are fastened to the outer periphery of their respective bodies. The net result is that, when the bodies are brought together to "closed" condition, the ridge 55 carries its own seal 52 into the groove 47 of the other body as well as the seal 48. The ridge 49 also acts on its own seal 48 as well as the seal 52 of the other body; it pushes them both into the groove 53. The groove 47 of the first body 43 is provided with a pressure ring 56 which is mounted on a plurality of spring-biased plungers 57 (see FIG. 8); a similar pressure ring 58 mounted on plungers 59 is associated with the groove 53 of the second body 45. These pressure rings not only assure that the seal leaves the groove when the bodies are separated, but it presses the seals together at intermediate positions of the bodies between "closed" and "open" conditions. As is evident in FIG. 7, an excellent seal is provided against entrance of debris from the outer peripheries of the bodies. The walls 51 and 54 provide a baffle at the inner periphery where it is less likely that foreign matter will exist. It is to be understood that in a flexible element for sealing purposes in accordance with the present invention, a spring means can be imbedded in the element. Such spring means will impart radial sealing and snap movement against a wall 51, for example. Also, the flexible element can comprise a laminate of slippery or low-friction material with resilient means secured thereto.

It is obvious that minor changes may be made in the form and construction of the invention without departing from the material spirit thereof. It is not, however, desired to confine the invention to the exact form herein shown and described.

The invention having been thus described, what is claimed as new and desired to secure by Letters Patent is:

1. A connector, comprising
 (a) a first body,
 (b) a second body,
 (c) a predetermined array of projections mounted on each body and extending toward the other body, the two arrays of projections being of complementary form to permit an accurate location of the first body relative to the second body, and
 (d) seal means movable toward and away from the the projections to protect the said projections from foreign matter both when the projections are in and out of engagement.

2. A connector as recited in claim 1, wherein the seal means comprises a flexible element which has a natural shape to overlie the projections when the bodies are separated and wherein apparatus is provided to withdraw the element from the projections when the bodies approach one another to bring about engagement of the projections.

3. A connector as recited in claim 2, wherein the flexible element is in the general form of a circular strip, the outer periphery being fixed to one of the bodies and the inner periphery being free and overlying the projections associated with that body.

4. A connector as recited in claim 2, wherein each body is provided with its own flexible element and the two elements cooperate, when the bodies are brought together for engagement of the projections, to protect the engaged projections from foreign matter.

5. A connector as recited in claim 2, wherein the said apparatus consists of a groove on one body underlying an intermediate portion of its flexible element and a ridge on the other body adapted, when the two bodies approach one another, to strike the said intermediate portion of the flexible element and move it into the groove.

6. A connector as recited in claim 5, wherein a spring-loaded thrust element lies in the said groove to return the intermediate portion of the flexible element to its normal position out of the groove when the said ridge is removed by the separation of the bodies.

7. A connector as recited in claim 5, wherein the two bodies are of generally annular form and of approximately the same size, wherein the arrays of projections lie opposite one another intermediate of the inner and outer peripheries, wherein the flexible element of one body is fixed to its outer periphery and extends radially inwardly to cover its projections and the flexible element of the other body is fixed to its inner periphery and extends radially outwardly to cover its projections, and wherein the groove of the said one body is located outwardly of its array and the groove of the said other body is located inwardly of its array.

8. A connector as recited in claim 5, wherein the two bodies are of generally annular form and of approximately the same size, wherein the arrays of projections lie opposite one another adjacent the inner peripheries of the bodies, wherein a groove of one body and a ridge of the other are located concentrically of the arrays but outwardly thereof, wherein a groove of the said other body and the ridge of the said one body are located concentricaly of the first-named groove and ridge but outwardly thereof, and wherein the flexible element associated with each body is fastened to its outer periphery.

9. A connector as recited in claim 8, wherein the periphery of the body having its groove located inwardly of its ridge is located adjacent its ridge and adjacent the groove of the other body, its ridge pressing not only the flexible element of the other body into the groove of the other body, but pressing its own flexible element into the groove of the other body.

References Cited

UNITED STATES PATENTS

| | | | |
|---|---|---|---|
| 3,038,054 | 6/1962 | Naimer | 277—56 X |
| 3,089,344 | 5/1963 | Lafitte | 192—108 X |
| 3,144,280 | 8/1964 | Sorenson. | |

DAVID J. WILLIAMOWSKY, Primary Examiner

W. L. SHEDD, Assistant Examiner

U.S. Cl. X.R.

192—67, 108; 277—57